United States Patent [19]

Nenna

[11] Patent Number: 4,600,548

[45] Date of Patent: Jul. 15, 1986

[54] METHOD OF FORMING THE PRIMARY CORE OF A PRESTRESSED CONCRETE PIPE

[75] Inventor: Vito Nenna, Pittstown, N.J.

[73] Assignee: Vinen Corp., Clinton, N.J.

[21] Appl. No.: 457,009

[22] Filed: Jan. 10, 1983

[51] Int. Cl.[4] .......................... B28B 1/10; B29C 39/12

[52] U.S. Cl. ...................................... 264/71; 264/261; 264/269; 264/271.1; 264/254; 264/256; 264/312; 264/333

[58] Field of Search .................. 264/312, 98, DIG. 43, 264/69–71, 267, 269, 256, 333, 310, 336, 338, 261, 271.1, 254; 106/98; 425/110, 324.1

[56] References Cited

U.S. PATENT DOCUMENTS

| | | | |
|---|---|---|---|
| 154,245 | 8/1874 | Halladay | 425/110 |
| 1,368,756 | 2/1921 | Ross | 264/DIG. 43 |
| 1,597,220 | 8/1926 | Tuerck et al. | 264/312 |
| 1,782,446 | 11/1930 | Schultz | 264/312 |
| 1,810,583 | 6/1931 | Tuerck | 264/312 |
| 1,895,740 | 1/1933 | Ukropina | 264/312 |
| 2,296,018 | 9/1942 | Boyle | 264/71 |
| 2,585,756 | 2/1952 | Eschenbrenner | 264/71 |
| 2,602,980 | 7/1952 | Bryan | 425/110 |
| 2,605,533 | 8/1952 | Hirsh | 425/110 |
| 3,492,395 | 1/1970 | Breitfuss | 425/110 |
| 3,655,842 | 4/1972 | Trautner | 264/312 |
| 3,754,954 | 8/1973 | Gabriel et al. | 106/98 |
| 3,767,433 | 10/1973 | Haldas et al. | 106/98 |
| 4,041,118 | 8/1977 | Ottman et al. | 264/71 |

OTHER PUBLICATIONS

Hool et al., Concrete Practice, McGraw-Hill (1926) N.Y. pp. 18, 19, 28–33.

Lea et al., The Chemistry of Concrete, Arnold London (1956) p. 153.

*Primary Examiner*—Willard E. Hoag

*Attorney, Agent, or Firm*—Marshall & Melhorn

[57] ABSTRACT

The present invention relates to a method of forming the primary core of a concrete pipe. A steel cylinder is disposed vertically on the base of the pipe forming machine. A conventional rotary packerhead having a diameter less than the inner diameter of the steel cylinder is lowered concentrically to the bottom thereof. Concrete is then introduced within the steel cylinder through the upper end thereof. The packerhead is rotated to force the concrete into the annular gap between the packerhead and the steel cylinder. As the primary core is formed, the packerhead is raised and rotated while concrete is introduced within the steel cylinder, thereby forming a primary core consisting of a steel cylinder having an inner lining of concrete. In an alternative embodiment, the steel cylinder is completely embedded within the concrete.

1 Claim, 3 Drawing Figures

METHOD OF FORMING THE PRIMARY CORE OF A PRESTRESSED CONCRETE PIPE

BACKGROUND OF THE INVENTION

1. Field of the Invention

Cylindrical prestressed concrete pipe is widely used today for conveying pressure fluids. Most such concrete pipe includes a primary cylindrical metal core which is either completely embedded in the concrete or disposed adjacent the outer surface of the concrete. The primary core is subsequently prestressed by circumferentially wrapping steel wire at a predetermined tension throughout the entire length thereof. The prestressed core is then covered with a concrete coating to protect the wire wrapping. It will be appreciated that concrete pipe having such a primary core differs substantially from standard concrete pipe of the type utilized in storm and sanitary sewers, both in structure and in application.

2. Description of the Prior Art

The traditional method of forming the latter of the above mentioned primary cores involves the step of initially orienting the longitudinal axis of the metal cylinder in a horizontal direction. The metal cylinder is then rapidly rotated about its longitudinal axis and concrete is applied to the interior surface thereof. Centrifugal action causes the concrete to accumulate and, thereby, bind to the inner wall of the rotating steel cylinder. The concrete is then allowed to cure, and the steel cylinder containing the inner lining of concrete is removed from the manipulating apparatus.

The traditional method of forming the former of the above mentioned primary cores involves the step of initially disposing the steel cylinder vertically between cooperating inner and outer mold forms. Concrete is then introduced between the cooperating mold forms and compacted by vibrating the inner and outer mold forms. After the concrete has been allowed to cure, the inner and outer mold sections are removed, permitting removal of the primary core.

The packerhead method of forming conventional or standard concrete pipe has been known for some time and is widely accepted as the least expensive and most efficient method of forming such concrete pipe. Generally, a machine for forming pipe by this method includes an outer vertically disposed jacket for forming the outer surface of a pipe section and an inner vertically reciprocable rotary packerhead. The packerhead is concentrically disposed with respect to the jacket for forming the interior surface of the pipe section. The completed pipe section may typically be formed to include a female end and a male end on opposite ends thereof.

The conventional steps in the process for forming standard pipe are as follows. The jacket is disposed vertically with the female end facing downwardly. The rotary packerhead is then lowered concentrically within the jacket to the bottom thereof. The packerhead includes a rotating cylindrically shaped base member having an outer diameter equal to the inside diameter of the completed pipe section, a rotary pipe forming assembly from which the base member depends, and a plurality of radially spaced trowels or rollers for forming and shaping the interior surface of the pipe section. A circular plate having a plurality of vertically disposed concrete slingers thereon can be secured to the packerhead above the plurality of trowels or rollers for initially forming the pipe. A shaft supports and rotates the entire packerhead assembly.

Concrete is introduced into the interior of the jacket through the upper end thereof. The packerhead is rotated to form the female end of the pipe. Once the female end of the pipe is formed, the rotating packerhead is raised while concrete is introduced into the jacket to form the cylindrical body of the pipe. When the rotating packerhead reaches the uppermost terminus of travel, and prior to the time the concrete has cured, an additional pass of the packerhead vertically throughout the jacket can be accomplished to effectively provide a smooth finish to the interior surface of the formed pipe. During pipe formation and thereafter, the jacket may be vibrated to assist in causing the concrete to compact and eliminate any voids which might occur in the pipe wall. Thereafter, the packerhead is removed and the jacket with the completed pipe therein is moved for curing, whereupon a new jacket is provided and the process repeated.

U.S. Pat. No. 3,276,091 to Pausch discloses an apparatus for forming concrete pipes including a roller head and troweling cylinder having a downwardly depending cylindrical skirt. A head plate is bolted across the upper end of the troweling cylinder. An annular array of symmetrically and circumferentially spaced eccentrically adjustable roller packer units is disposed to extend upwardly from the head plate. An aggregate spreader plate is disposed above the roller packer units. A plurality of aggregate slingers disposed on the spreader plate is adapted to propel aggregate into the paths of the roller packer units.

U.S. Pat. No. 3,733,163 to Hermann discloses an improved wear surface for long bottoms employed in concrete pipe making machines utilizing the packerhead method of pipe formation. The long bottom of the packerhead includes a plurality of wear segments disposed about the upper circumferential outer surface thereof. U.S. Pat. No. 3,829,268 to Gill discloses a packerhead concrete pipe machine operable to make a cylindrical concrete pipe in an upright mold. The machine has a triangular frame assembly formed with three upright frame members, each affixed to each other by suitable cross braces. A rotatable turntable has a center hole for accommodating one of the frame members. The turntable carries three molds and is sequentially rotated to move the molds in longitudinal alignment with the packerhead and a cylindrical core having vibrating units.

U.S. Pat. No. 3,922,133 to Crawford et al. discloses a packerhead/vibration system for a concrete pipe machine. An overfill and compaction ring assembly is mounted on the top of the pipe mold, enabling complete formation of the concrete pipe in one stage. The method of vibratory concrete pipe manufacture includes the steps of overfilling the pipe mold in the pipe-forming process, vibrating the concrete forming the pipe, and compressing the overfilled concrete into a space created by densification of the pipe material caused by vibration.

Other related concrete pipe forming systems are disclosed in U.S. Pat. Nos. 2,178,015 to Brunetti, 2,751,657 to Holston, 2,966,766 to Ronaldson et al., 3,096,556 to Woods, 3,262,175 to Gourlie et al., 3,551,968 to Fosse et al., 3,649,727 to Gauger, 4,197,074 to Christian, 4,334,848 to Gross et al., 4,336,013 to Hand, and 4,340,553 to Fosse.

SUMMARY OF THE INVENTION

The present invention relates to a method of forming the primary core of a concrete pipe suitable for use in conducting pressure fluids. A steel cylinder is disposed vertically on the base of the pipe forming machine. A conventional rotary packerhead having a diameter less than the inner diameter of the steel cylinder is lowered concentrically to the bottom thereof. Concrete is then introduced within the steel cylinder through the upper end thereof. The packerhead is rotated to force the concrete into the annular gap between the packerhead and the steel cylinder. As the primary core is formed, the packerhead is simultaneously raised and rotated while concrete is introduced within the steel cylinder, thereby forming a primary core consisting of a steel cylinder having an inner lining of concrete. In an alternative embodiment, the steel cylinder (pipe) is completely embedded within the concrete.

It is an object of the present invention to provide a novel and improved method of forming the primary core of a concrete pressure pipe.

It is another object of the present invention to provide a method of forming such a primary core more rapidly and efficiently.

Other objects and advantages of the present invention will become apparent to those skilled in the art from the following detailed description of the preferred embodiment of the invention, when read in light of the accompanying drawings.

DETAILED DESCRIPTION OF THE PREFERRED EMBODIMENT

Figure 1:
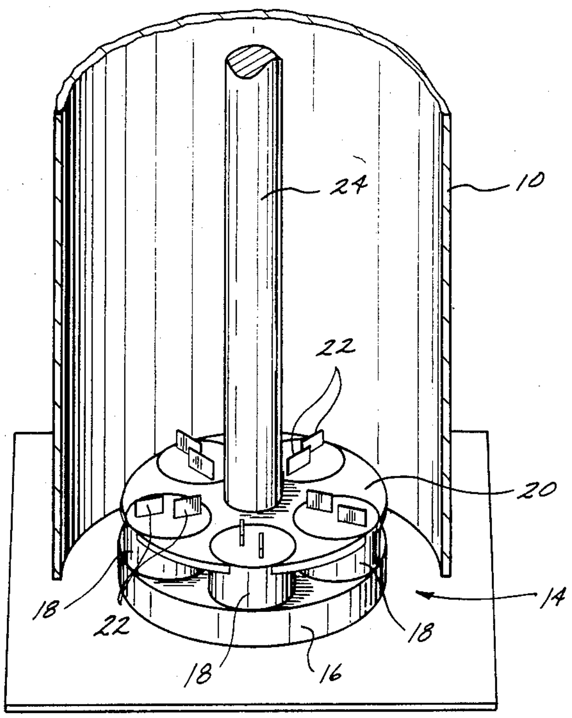
FIG. 1 is a perspective view of an apparatus for forming the primary core of a concrete pressure pipe in accordance with the present invention.
Figure 2:
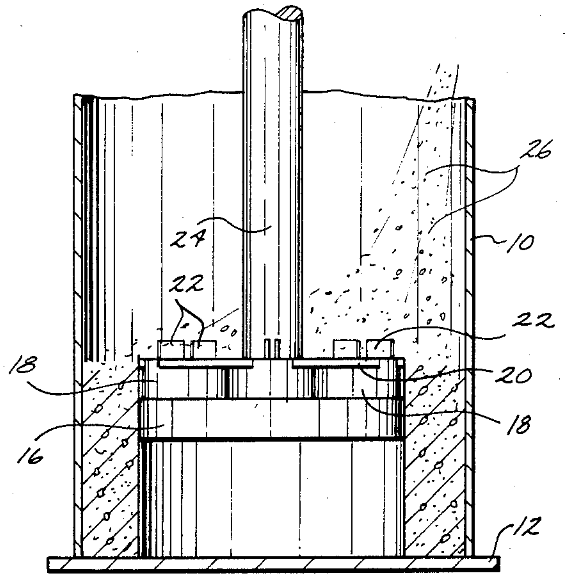
FIG. 2 is a side elevational view of the apparatus of FIG. 1.

Referring now to the drawings, there is illustrated in FIGS. 1 and 2 an apparatus for forming the primary core of a prestressed concrete pipe in accordance with the present invention. A hollow steel cylinder 10 is disposed vertically on a base 12 of the primary core forming apparatus. If desired, a joint ring (not shown) can be welded to the bottom end of the steel cylinder 10 to effect a secure connection between pipe sections. The joint ring is conventional in the art and consists of an annular sleeve having an increasing diameter portion, the smaller end of which is welded to the steel cylinder 10. A rubber gasket (not shown) can be utilized to prevent fluid leakage from the joint.

A conventional packerhead of the type generally illustrated and described in U.S. Pat. No. 3,276,091, indicated generally at 14, is then lowered concentrically within the cylinder 10 to the base 12. The packerhead 14 includes a rotating cylindrically shaped base member 16, a plurality of radially spaced rollers rotatably secured to the upper side of the base member 16, and a circular plate 20 disposed above the plurality of rollers 18. The circular plate 20 has a plurality of apertures formed therein for allowing one or more upstanding concrete slingers 22, each attached to a respective one of the rollers 18, to extend therethrough above the circular plate 20. The entire packerhead 14 is mounted on a rotatable shaft 24 extending throughout the length of the steel cylinder 10.

After the packerhead 14 is lowered to the bottom of the steel cylinder 10, concrete 26 is introduced into the upper end of the steel cylinder 10. The concrete 26 falls under the influence of gravity onto the circular plate 20. As the packerhead 14 is rotated, some of the concrete 26 is effectively forced by the slingers 22 into the annular gap between the outer wall of the packerhead 14 and the inner wall of the steel cylinder 10. As is known, the shaft 24 rotates the base member 16 rotates in one direction while the rollers 18 are caused to rotate in an opposite direction to suitably radially compress the concrete 26 against the inside wall of the steel cylinder 10 to form a lining thereon. As the concrete begins to cure, the packerhead 14 is raised upwardly throughout the steel cylinder 10 while continuing to be rotated. In this manner, the concrete lining is applied to the entire length of the steel cylinder 10. The entire lining process typically occurs in less than five minutes. Once the lining is applied to the steel cylinder 10 and has sufficiently cured, the lined primary core can be removed and another steel cylinder 10 to be lined can be positioned in the apparatus. The lined primary core may then be allowed to naturally cure or be placed in a kiln to effect an accelerated final curing.

Figure 3:
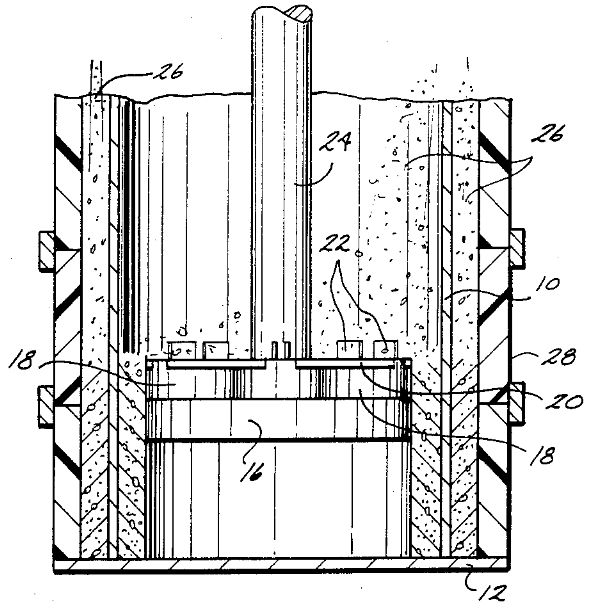
FIG. 3 is a perspective view of an alternative embodiment of the present invention.

Referring now to FIG. 3, there is illustrated an apparatus for forming the primary core of a concrete pipe wherein the steel cylinder 10 is completely embedded within the concrete 26. An outer mold 28 is disposed coaxially about the steel cylinder 10 to create an annular gap therebetween. The concrete 26 is then introduced within the steel cylinder 10 and between the steel cylinder 10 and the outer mold 28. Vibrating means (not shown) can be provided to vibrate the outer mold 28 in an known manner to compact the concrete 26 between the steel cylinder 10 and the outer mold 28.

Typically, the standard length of the steel cylinder 10 is twenty feet. The inner diameter of the primary core generally ranges from twenty-four to sixty inches. It has been found desirable to increase the total wall thickness of the primary core, including the steel cylinder 10, in proportion to the inner diameter of the core. Typically, the total wall thickness of the primary core is approximately one-sixteenth of the inner diameter of the core. Thus, a primary core having an inner diameter of twenty-four inches would have a total wall thickness of one and one-half inches while a primary core having an inner diameter of forty-eight inches would have a total wall thickness of three inches.

It has been found desirable to utilize a "zero slump" concrete in the manufacture of either type of primary core. Zero slump concrete is drier than concrete used in the past in the manufacture of prestressed concrete pipe, requiring less cement and, thereby, creating a resultant obvious economic advantage. Also, the curing time to achieve a specified compressive strength required for prestressing is dramatically less with the utilization of zero slump concrete as opposed to high slump concrete. Furthermore, the utilization of zero slump concrete eliminates a recognized imperfection in prestressed concrete cylinder pipe known as slump cracking. Slump cracking refers to the wide spread occurrence of small fractures following circumferential prestressing of the primary core manufactured by the horizontal centrifugal method with high slump concrete.

A typical mixture of zero slump concrete consists of approximately 72 parts cement, 146 parts aggregate, and 208 parts sand, together with one part water by weight. For example, to form one cubic yard of zero slump concrete, the constituents would include 1875 pounds of sand, 1312 pounds of aggregate, 650 pounds of cement, and approximately nine gallons of water, depending upon the moisture content of the aggregate. Suitable results have been achieved by utilizing five-eighths inch diameter crushed stone aggregate and Portland Type Two cement.

Ater the primary core has been formed in either of the above-discussed methods, the core is prestressed by wrapping it with high tensile strength wire in a helical form at a predetermined spacing and tension for substantially the full length of the core. A cement mortar coating is applied to the primary core after it has been wrapped under tension with the high tensile wire. Typically, the mortar used consists of one part cement and not more than three parts of fine aggregate. The mortar is applied against the exterior surface of the primary core to produce a dense coating around the prestressed wires and cylinder. Concurrently with the mortar coating, a cement slurry is applied to the core. According to the conditions of the laying of the pipe in the ground and the chemical composition of the ground, the slurry may include epoxy resins which increase the mechanical and chemical resistance of the coating. The outer coating is cured in a manner similar to that described above. If necessary, a layer of bituminous material can be applied to the exterior of the cured coating to further protect the pipe from particularly aggresive chemicals in the ground.

The combination of a vertical pour of zero slump concrete with radial compaction of the concrete against the steel cylinder has several distinct advantages. First, the method of the present invention eliminates the void which commonly occurs between the steel cylinder and the concrete as the pipe structure cures in a horizontal disposition. Such a void is generally believed to be caused by the effect of gravity. The most dramatic manifestation of the phenomenon is the complete failure of the concrete to bind to the steel cylinder after curing. When this occurs, the concrete must be cleaned from the cylinder so as to salvage the cylinder for recycling.

Second, utilizing the method of the present invention produces a primary core which is homogeneous throughout its structure, thereby contributing to the strength of the finished product. With the conventional horizontal centrifugal method, there is a tendency for the coarse aggregate to move outwardly toward the surrounding steel cylinder, while the finer components of the aggregate are caused to be disposed inwardly towards the center or inner surface of the primary core. Such centrifugal action thereby causes a non-homogoneous mixture detrimentally affecting the overall strength and integerity of the primary core. Also, the finer components of the aggregate disposed adjacent the inner surface of the primary core by the previously known methods are predisposed to flaking and cracking. Furthermore, the inner surface of such a primary core must be sandblasted if the application of an epoxy or bituminous coating is desired. Such sandblasting is not required with primary cores formed in accordance with the present invention.

In accordance with the provisions of the patent statutes, the principle and mode of operation of the present invention have been explained and illustrated in its preferred embodiment. However, it must be understood that the present invention can be practiced otherwise and as specifically explained and illustrated without departing from its spirit or scope.

What is claimed is:

1. A method of forming an adherent concrete lining on the inside surface of a cylindrical metal pipe and an adherent concrete casing about the outside surface of the metal sleeve comprising the steps of:

(a) positioning a cylindrical metal sleeve having a predetermined height in substantially vertical and coaxial relationship within a cylindrical mold having substantially the same height as the metal sleeve such that the outer surface of the metal sleeve is spaced from the inner surface of the mold;

(b) supplying concrete to the space between the outer surface of the metal sleeve and the inner surface of the mold while vibrating the mold to compress the concrete therebetween to form an adherent concrete casing about the outer surface of the metal sleeve;

(c) simultaneously with step (b), supplying concrete to the interior of the metal sleeve;

(d) simultaneously with step (b), radially compressing the concrete in the metal sleeve against the inner surface thereof to form a concrete lining along the length of the inner surface of the metal sleeve; and (e) removing the metal sleeve having the inner concrete lining and the outer concrete casing from the mold.

* * * * *